(12) United States Patent
Leone et al.

(10) Patent No.: US 9,925,975 B2
(45) Date of Patent: Mar. 27, 2018

(54) METHOD AND SYSTEM FOR HYBRID VEHICLE CONTROL

(71) Applicant: Ford Global Technologies, LLC, Dearborn, MI (US)

(72) Inventors: Thomas G. Leone, Ypsilanti, MI (US); Kenneth James Miller, Canton, MI (US); Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 15 days.

(21) Appl. No.: 15/146,752

(22) Filed: May 4, 2016

(65) Prior Publication Data
US 2017/0320482 A1 Nov. 9, 2017

(51) Int. Cl.
*B60W 20/00* (2016.01)
*B60K 6/00* (2006.01)
(Continued)

(52) U.S. Cl.
CPC .............. *B60W 20/16* (2016.01); *B60K 6/24* (2013.01); *B60K 6/26* (2013.01); *B60K 6/36* (2013.01); *B60K 6/40* (2013.01); *B60K 6/445* (2013.01); *B60K 6/543* (2013.01); *B60W 10/06* (2013.01); *B60W 10/08* (2013.01); *B60W 10/107* (2013.01); *B60W 20/13* (2016.01); *F02M 26/16* (2016.02); *F02M 26/36* (2016.02);
(Continued)

(58) Field of Classification Search
CPC ...... B60W 10/00; B60W 10/04; B60W 10/06; B60W 10/08; B60K 6/00; B60K 11/00
See application file for complete search history.

(56) References Cited

U.S. PATENT DOCUMENTS 3,254,620 A 6/1966 Cannon
3,640,894 A 2/1972 Sampson et al.
(Continued)

FOREIGN PATENT DOCUMENTS

CA 2762747 A1 7/2012
CN 1223335 A 7/1999
(Continued)

OTHER PUBLICATIONS

Hoffmann, W., et al., "A New Approach to Ethanol Utilization: High Efficiency and Low NOx in an Engine Operating on Simulated Reformed Ethanol," SAE Technical Paper 2008-01-2415, Powertrains, Fuels & Lubricants Meeting, Rosemont, IL, Oct. 6-9, 2008, 11 pages.
(Continued)

*Primary Examiner* — Yonel Beaulieu
(74) *Attorney, Agent, or Firm* — David Kelley; McCoy Russell LLP

(57) ABSTRACT

Methods and systems are provided for synergizing the benefits of an engine exhaust driven fuel reformer in a hybrid vehicle system. A vehicle controller may hold the engine in a narrow operating range where fuel reformer operation is optimal while using motor and/or CVT adjustments to address transients generated as driver demand varies. The controller may also adjust an operating range of temperatures of the reformer to enable extended fuel reforming even after the engine of the hybrid has been shutdown.

19 Claims, 5 Drawing Sheets

(51) Int. Cl.

| | | |
|---|---|---|
| *B60K 11/00* | (2006.01) | |
| *B60W 20/16* | (2016.01) | |
| *B60W 10/06* | (2006.01) | |
| *B60W 10/08* | (2006.01) | |
| *B60W 10/107* | (2012.01) | |
| *F02M 26/52* | (2016.01) | |
| *F02M 26/36* | (2016.01) | |
| *F02M 26/16* | (2016.01) | |
| *F02M 26/41* | (2016.01) | |
| *B60K 6/24* | (2007.10) | |
| *B60K 6/40* | (2007.10) | |
| *B60K 6/543* | (2007.10) | |
| *B60K 6/36* | (2007.10) | |
| *B60K 6/26* | (2007.10) | |
| *B60K 6/445* | (2007.10) | |
| *B60W 20/13* | (2016.01) | |
| *F16H 37/08* | (2006.01) | |

(52) U.S. Cl.
CPC ............ *F02M 26/41* (2016.02); *F02M 26/52* (2016.02); *B60W 2510/244* (2013.01); *B60W 2710/0694* (2013.01); *B60W 2710/083* (2013.01); *B60W 2710/1005* (2013.01); *B60Y 2200/92* (2013.01); *B60Y 2300/47* (2013.01); *B60Y 2400/442* (2013.01); *F16H 2037/0866* (2013.01); *Y10S 903/905* (2013.01); *Y10S 903/906* (2013.01); *Y10S 903/909* (2013.01); *Y10S 903/918* (2013.01); *Y10S 903/93* (2013.01); *Y10S 903/951* (2013.01)

(56) References Cited

U.S. PATENT DOCUMENTS

| | | | |
|---|---|---|---|
| 4,391,716 A | 7/1983 | McCurry | |
| 4,505,169 A | 3/1985 | Ganoung | |
| 5,237,978 A | 8/1993 | Bailey | |
| 5,408,874 A | 4/1995 | Fleck, Sr. et al. | |
| 5,785,136 A | 7/1998 | Falkenmayer et al. | |
| 5,806,617 A | 9/1998 | Yamaguchi | |
| 6,116,363 A | 9/2000 | Frank | |
| 6,276,473 B1 | 8/2001 | Zur Megede | |
| 6,378,637 B1 | 4/2002 | Ono et al. | |
| 6,450,193 B1 | 9/2002 | Constantinou | |
| 6,655,324 B2 | 12/2003 | Cohn et al. | |
| 6,715,452 B1 | 4/2004 | Taylor, III et al. | |
| 6,715,453 B2 | 4/2004 | Tomatsuri et al. | |
| 6,796,287 B2 | 9/2004 | Mogi et al. | |
| 6,851,398 B2* | 2/2005 | Taylor, III .............. | F02B 43/10 123/1 A |
| 6,915,766 B2 | 7/2005 | Aoyama et al. | |
| 6,929,582 B2 | 8/2005 | Yang et al. | |
| 6,970,781 B1 | 11/2005 | Chen et al. | |
| 7,213,397 B2 | 5/2007 | Hu et al. | |
| 7,258,099 B2 | 8/2007 | Yoshida et al. | |
| 7,267,087 B2 | 9/2007 | Glugla | |
| 7,295,902 B2 | 11/2007 | Chen et al. | |
| 7,426,907 B2 | 9/2008 | Dearth et al. | |
| 7,703,435 B2 | 4/2010 | Surnilla et al. | |
| 7,676,321 B2 | 5/2010 | Andri | |
| 7,748,481 B2 | 7/2010 | Holmes et al. | |
| 7,770,545 B2* | 8/2010 | Morgenstern ........... | C01B 3/323 123/1 A |
| 7,805,238 B2 | 9/2010 | Andri | |
| 7,826,957 B2 | 11/2010 | Fabien | |
| 7,832,511 B2 | 11/2010 | Syed et al. | |
| 7,845,315 B2 | 12/2010 | Leone et al. | |
| 7,925,418 B2 | 4/2011 | Fabien | |
| 8,015,951 B2 | 9/2011 | Dearth et al. | |
| 8,050,831 B2 | 11/2011 | Martin et al. | |
| 8,065,979 B2 | 11/2011 | Leone et al. | |
| 8,118,009 B2 | 2/2012 | Pursifull et al. | |
| 8,127,745 B2 | 3/2012 | Surnilla et al. | |
| 8,141,356 B2 | 3/2012 | Leone et al. | |
| 8,312,867 B2 | 11/2012 | Pursifull et al. | |
| 8,342,140 B2* | 1/2013 | Surnilla ............... | F02D 19/0644 123/3 |
| 8,350,015 B2* | 1/2013 | Aizawa ................. | C09B 69/045 430/270.18 |
| 8,352,160 B2* | 1/2013 | Leone ................... | F02D 41/003 123/406.47 |
| 8,375,899 B2 | 2/2013 | Leone et al. | |
| 8,387,591 B2 | 3/2013 | Surnilla et al. | |
| 8,516,980 B2* | 8/2013 | Leone ..................... | F02B 43/12 123/27 GE |
| 8,539,914 B2* | 9/2013 | Kerns .................... | F02B 43/10 123/1 A |
| 8,550,037 B2* | 10/2013 | Czekala ................. | F02D 37/02 123/3 |
| 8,550,058 B2 | 10/2013 | Pursifull et al. | |
| 8,606,474 B2 | 12/2013 | Guo et al. | |
| 8,635,977 B2* | 1/2014 | Pursifull ............... | F02D 19/087 123/1 A |
| 8,656,869 B2 | 2/2014 | Leone et al. | |
| 8,662,024 B2* | 3/2014 | Leone ................... | F02D 41/0027 123/299 |
| 8,701,630 B2 | 4/2014 | Surnilla et al. | |
| 8,738,255 B2 | 5/2014 | Carter et al. | |
| 8,746,189 B2 | 6/2014 | Kawasaki | |
| 9,038,613 B2 | 5/2015 | Pursifull et al. | |
| 9,157,385 B2 | 10/2015 | Gallagher et al. | |
| 9,376,967 B2 | 6/2016 | Springer et al. | |
| 2004/0079564 A1* | 4/2004 | Tabata .................. | B60K 6/365 180/65.21 |
| 2004/0188154 A1 | 9/2004 | Carlson | |
| 2005/0166869 A1* | 8/2005 | Shkolnik ................. | F01K 7/36 123/19 |
| 2006/0113129 A1* | 6/2006 | Tabata .................. | B60K 6/365 180/65.25 |
| 2010/0063658 A1 | 3/2010 | Martin et al. | |
| 2011/0029177 A1 | 2/2011 | Yeung et al. | |
| 2011/0132288 A1* | 6/2011 | Pursifull ................ | F02B 43/10 123/3 |
| 2011/0132306 A1* | 6/2011 | Kerns .................... | F02B 43/10 123/1 A |
| 2011/0137537 A1* | 6/2011 | Leone .................. | F02D 41/0027 701/102 |
| 2011/0246010 A1 | 10/2011 | de la Torre Bueno | |
| 2012/0055423 A1* | 3/2012 | Pursifull ................ | F02B 43/10 123/3 |
| 2013/0000570 A1* | 1/2013 | Leone ..................... | F02B 43/12 123/3 |
| 2013/0055990 A1 | 3/2013 | Kamada | |
| 2014/0067540 A1 | 3/2014 | Williams et al. | |
| 2014/0116395 A1 | 5/2014 | Blackstock | |
| 2014/0202430 A1 | 7/2014 | Monros | |
| 2015/0114359 A1 | 4/2015 | Leone et al. | |
| 2015/0300830 A1 | 10/2015 | Fisher | |

FOREIGN PATENT DOCUMENTS

| | | |
|---|---|---|
| CN | 103291468 A | 9/2013 |
| CN | 104005861 A | 8/2014 |
| CN | 203756344 U | 8/2014 |
| JP | 407019124 A | 1/1995 |
| JP | 2006257907 A | 9/2006 |
| JP | 2007077918 A | 3/2007 |
| SU | 0731020 | 4/1980 |
| SU | 0848725 | 7/1981 |
| WO | 2007027327 A2 | 3/2007 |

OTHER PUBLICATIONS

Kadota, M. et al., "Advanced Control System of Variable Compression Ratio (VCR) Engine with Dual Piston Mechanism," SAE International 2009-01-1063, Apr. 20, 2009, 10 pages.

Wheeler, Jennifer C. et al., "High Efficiency, Low Feedgas NOx, and Improved Cold Start Enabled by Low Temperature Ethanol

(56) References Cited

OTHER PUBLICATIONS

Reforming," SAE International 2010-01-0621, Apr. 12, 2010, 18 pages.
Wheeler, Jennifer C. et al., "Low-Temperature Ethanol Reforming: A Multi-Cylinder Engine Demonstration," SAE International 2011-01-0142, Apr. 12, 2011, 20 pages.
Kleeberg, Henning et al., "Increasing Efficiency in Gasoline Powertrains with a Two-Stage Variable Compression Ratio (VCR) System," SAE International 2013-01-0288, Apr. 8, 2013, 10 pages.
Morgenstern, David et al., "Integration of an E85 Reforming System into a Vehicle-Ready Package and Project Results," SAE International 2014-01-1191, Apr. 1, 2014, 12 pages.
Ferrey, Paul et al., "Potential of a Variable Compression Ratio Gasoline SI Engine with Very High Expansion Ratio and Variable Valve Actuation," SAE International 2014-01-1201, Apr. 1, 2014, 20 pages.
Gluga, Chris Paul, "Method and System for Pre-Ignition Control," U.S. Appl. No. 14/604,279, filed Jan. 23, 2015, 54 pages.
Gluga, Chris Paul, "Method and System for Engine Control," U.S. Appl. No. 14/923,900, filed Oct. 27, 2015, 41 pages.
Leone, Thomas G. et al., "Method and System for Engine Control," U.S. Appl. No. 15/146,720, filed May 4, 2016, 62 pages.
Miller, Kenneth James et al., "Method and System for Engine Control," U.S. Appl. No. 15/146,687, filed May 4, 2016, 54 pages.
Miller, Kenneth James et al., "Method and System for Engine Control," U.S. Appl. No. 15/146,784, filed May 4, 2016, 47 pages.
Miller, Kenneth James et al., "Method and System for Engine Control," U.S. Appl. No. 15/146,809, filed May 4, 2016, 52 pages.
Miller, Kenneth James et al., "Method and System for Engine Control," U.S. Appl. No. 15/146,822, filed May 4, 2016, 47 pages.

\* cited by examiner

METHOD AND SYSTEM FOR HYBRID VEHICLE CONTROL

FIELD

The present description relates generally to methods and systems for controlling fuel reforming in an engine of a hybrid vehicle system.

BACKGROUND/SUMMARY

Fuel reformers can be used to convert alcohol fuels into gaseous fuels (reformates) to fuel an engine. For example, an ethanol reformer can reform ethanol into a reformate gas comprising hydrogen ($H_2$), carbon monoxide (CO), and methane ($CH_4$) for combustion in an engine. The hydrogen content of the fuel improves combustion stability, enabling the engine to be operated with higher dilution levels (such as with higher EGR levels), thereby improving fuel economy. One example of an ethanol reformation system is shown by Kerns et al in U.S. Pat. No. 8,539,914. Therein, a flexible fuel engine is configured with a fuel reformer which reforms a variable ethanol fuel into a gaseous fuel reformate.

The inventors herein have recognized that the fuel economy benefits of the reformation system may be limited due to, as one example, the temperature variable efficiency of the reformer. In particular, since the reformer relies on exhaust energy for driving the endothermic reformation reaction, fuel reforming may not be possible at lower engine loads when the exhaust temperature is lower. Likewise, due to the efficiency of the reformer varying with exhaust temperature, a desired engine operating point that is most optimal for the reformer may vary significantly from the actual engine operating point at the time of reformation. All of these issues result in the optimal fuel economy benefit of the fuel reformer not being realized.

In view of these issues, the inventors herein have recognized that by integrating a fuel reformation system into a hybrid vehicle system, various synergies can be achieved. In one example, potential synergies are attained by a method for a hybrid vehicle comprising: responsive to lower than threshold engine load while an available reformate is lower than a threshold level, raising engine load above the threshold load and charging a system battery using excess engine torque; and reforming a liquid fuel using exhaust energy, the engine operated with the raised load until the available reformate is higher than the threshold level. In addition, responsive to an engine shutdown request, the engine may be shutdown while fuel reformation is continued until a reformer temperature is below a threshold. In this way, fuel economy of a vehicle with an on-board reformer can be enhanced.

As an example, a hybrid vehicle may be configured with a battery powered electric motor (or motor/generator) for propelling vehicle wheels via motor torque, as well as an engine for propelling vehicle wheels via engine torque, the engine including a fuel reformer. The engine may be propelled with a first, liquid fuel such as an ethanol-gasoline blended fuel. In addition, when there is insufficient gaseous fuel available, the reformer may be operated using engine exhaust energy to reform the liquid fuel into a gaseous fuel. For example, the ethanol fuel may be reformed into methane, hydrogen, and carbon dioxide, the hydrogen content of the reformate improving engine combustion stability. During conditions when the vehicle is propelled via the engine, and the engine load is high enough to maintain elevated exhaust temperatures (and therefore elevated reformer temperatures), the reformer may be operated and the presence of hydrogen in the reformate may enable the engine to be operated with higher engine dilutions (such as with higher EGR levels). In comparison, during lower load conditions, based on the state of charge of the battery, vehicle operation may be adjusted to prolong reformate usage. For example, if the battery state of charge is lower (and the battery is capable of accepting charge), the engine output may be raised above a level required for propulsion while the excess torque is used to charge the battery. Herein, the elevated engine output raises the exhaust temperature so that the reformer can be efficiently operated while the excess torque is stored in the battery to reduce any associated drivability issues. Else, if the battery cannot accept further charge, the load at which the engine is shutdown may be raised so that the vehicle can be propelled in an electric mode instead of operating the engine in a low load mode where fuel reformation is not possible. Anytime the reformer is operated, based on the reformer conditions, the engine may be held in a narrower engine speed-load that provides optimal reformer efficiency while torque transients are maintained via the system motor/battery. This allows for increased fuel reformation at higher reforming efficiencies. In addition, following an engine shutdown request, even after an engine shut down, reformer operation may be continued while the exhaust temperature is hot enough to support the reformation. Further, a temperature at which the reformer is deactivated may be adjusted based on the amount of available reformate.

In this way, by integrating an engine exhaust driven fuel reformer with a motor on a hybrid vehicle, various synergies can be achieved, improving vehicle fuel economy. The technical effect of raising an engine load even when torque demand is low, and increasing charging of a system energy storage device is that exhaust temperatures can be maintained elevated and reformer operation can be extended. By adjusting the load threshold at which an engine is shutdown, engine operation at higher loads can be maximized while engine operation at lower loads is minimized, improving reforming benefits. By extending reformer operation after an engine shutdown responsive to exhaust temperature, reformation conditions may be extended. By enabling reformate generation over a larger range of vehicle operating conditions, engine combustion stability may be improved and EGR usage can be increased, which provides fuel economy and emissions benefits. The technical effect of using battery/motor power to hold the engine in a narrow operating range selected based on reformer conditions is that the reformer can be operated at an optimal efficiency despite changes in driver or wheel torque demand. Overall, vehicle performance can be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
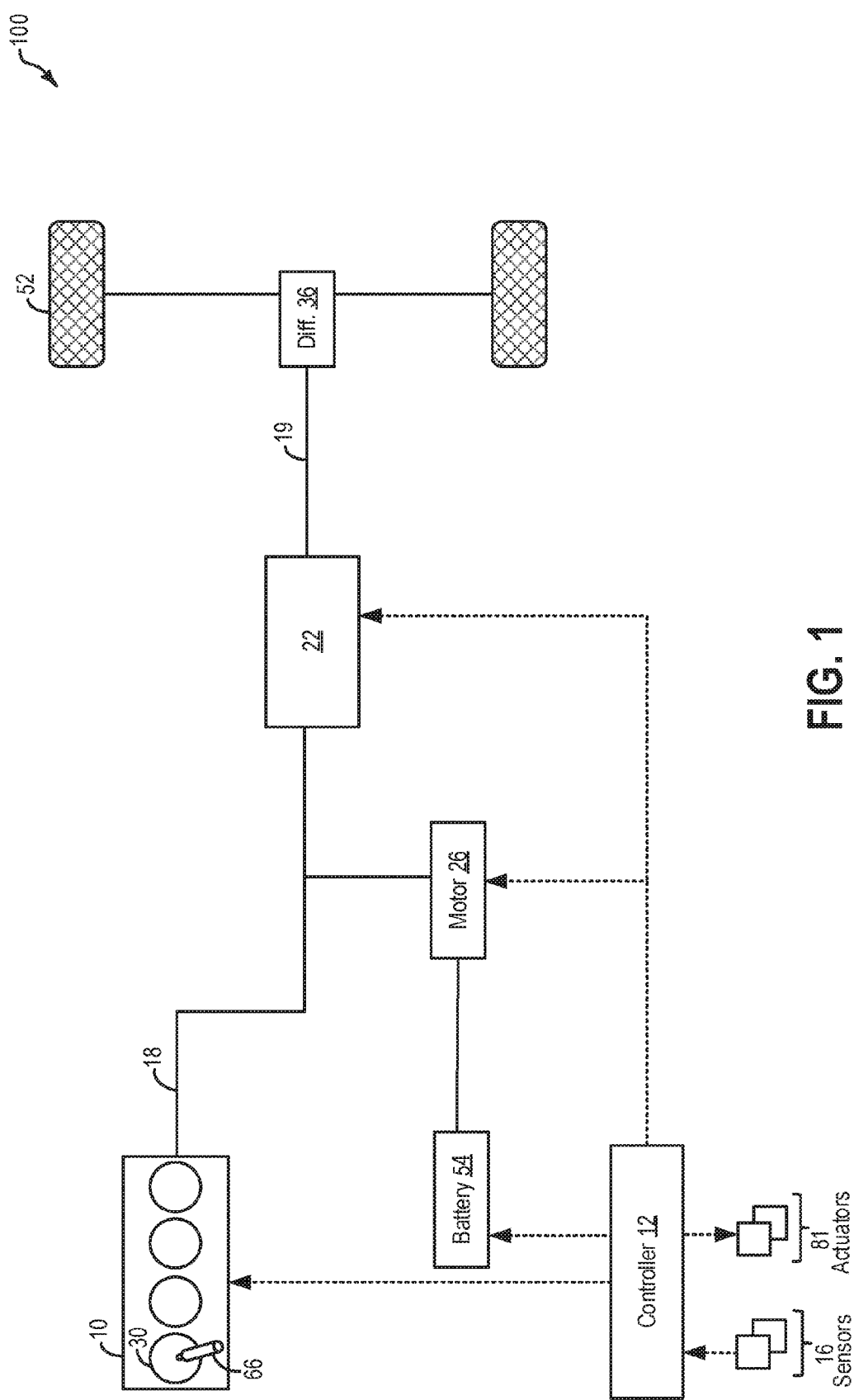
FIG. 1 illustrates an example propulsion system for a hybrid vehicle including a fuel reformer.

The following description relates to systems and methods for improving fuel economy in a hybrid vehicle system, such as the vehicle system of FIG. 1. The vehicle system may include an engine configured with an exhaust-driven reformer that enables reforming of a liquid fuel into a gaseous reformate, as described with reference to the engine system of FIG. 2. A controller may be configured to perform a control routine, such as the example routine of FIG. 3, to adjust engine operation while operating a reformer based on an available amount of gaseous fuel/reformate. The controller may also perform a routine, such as the example routine of FIG. 4, to adjust motor operation during the reforming to enable the engine to be held in a narrow operating range while maintaining a desired power level. An example hybrid vehicle operation with fuel reforming adjustments is shown at FIG. 5. In this way, fuel reformer technology can be synergized with hybrid vehicle technology to achieve significant fuel economy improvements.

FIG. 1 depicts a hybrid propulsion system 100 for a vehicle. In the depicted embodiment, the vehicle is a hybrid electric vehicle (HEV), but alternate embodiments could include hybrid vehicles using hydraulic, pneumatic, flywheel, or other energy storage systems and motors. Propulsion system 100 includes an internal combustion engine 10 having a plurality of cylinders 30. Fuel may be provided to each cylinder of engine 10 from a fuel system (not shown) including one or more fuel tanks, one or more fuel pumps, and injectors 66. A detailed embodiment of the engine is provided with reference to FIG. 2. As elaborated therein, engine 10 may be configured with a fuel reformer coupled to the engine's exhaust system for reforming a liquid fuel into a gaseous fuel/reformate. By injecting both the liquid fuel and the gaseous reformate into an engine cylinder, the engine may be effectively operated as a dual fuel engine even though the fuel tank is only refilled with a single fuel. In addition, various benefits of engine operation with reformate presence can be leveraged.

Engine 10 delivers power to transmission 22 via torque input shaft 18. Transmission 22 comprises an electronically controlled transmission with a plurality of selectable speed ratios. Transmission 22 may also comprises various other gears, such as, for example, a final drive ratio (not shown). In one example, transmission 22 is a continuously variable transmission (CVT). The CVT may be an automatic transmission that can change seamlessly through a continuous range of effective speed ratios, in contrast with other mechanical transmissions that offer a finite number of fixed gear ratios (speed ratios). The speed ratio flexibility of the CVT allows the input shaft to maintain a more optimized angular velocity. The engine may be coupled to the transmission 22 via an intermediate torque converter (not shown). Torque is output from transmission 22 for propelling vehicle tractions wheels 52, via torque output shaft 19, and differential-and-axle assembly 36. In some examples, a power transfer gearing may be additionally coupled between the transmission 22 and the output shaft 19.

The vehicle wheels may also be propelled using torque received from motor 26, configured herein as an electric motor. Specifically, electric motor 26 may be operated using electric energy from an electrical energy storage device, herein depicted as battery 54. In some embodiments, an energy conversion device, such as an inverter, may be coupled between the battery and the motor to convert the DC output of the battery into an AC output for use by the electric motor. However, in alternate embodiments, the inverter may be configured in the electric motor.

Electric motor 26 may be operated in a regenerative mode, that is, as a generator, to absorb energy from vehicle motion and/or the engine and convert the absorbed kinetic energy to an energy form suitable for storage in battery 54. Furthermore, electric motor 26 may be operated as a motor or generator, as required, to augment or absorb torque provided by the engine, such as during a transition of engine 10 between different combustion modes (e.g., during transitions between a spark ignition mode and a compression ignition mode). For example, during conditions when the engine torque output is higher than the driver demand, the torque difference may be absorbed at the motor and used to charge the battery, thereby smoothing out the torque transient.

Hybrid propulsion system 100 may be operated in various embodiments including a full hybrid system, wherein the vehicle is driven by only the engine and generator cooperatively, or only the electric motor, or a combination. Alternatively, assist or mild hybrid embodiments may also be employed, wherein the engine is the primary source of torque and the electric motor selectively adds torque during specific conditions, such as during a tip-in event. Accordingly, hybrid propulsion system 100 may be operated in various modes of operation.

For example, the vehicle may be driven in a first engine-on mode, herein also referred to as an "engine" mode, wherein engine 10 is used as the primary source of torque for powering wheels 52. During the "engine" mode, fuel may be supplied to engine 10 from a fuel tank via fuel injector 66 so that the engine can spin fueled to provide the torque for propelling the vehicle. Optionally, the engine can be operated to output more torque than is needed for propulsion, in which case the additional power is absorbed by the motor (in generating mode) to charge the battery 54 or supply electrical power for other vehicle loads. In this mode, only engine torque is used to propel the vehicle wheels.

In another example, the vehicle may be driven in a second engine-on mode, herein also referred to as an "assist" mode. During the assist mode, engine 10 is operated and used as the primary source of torque for powering wheels 52 and the electric motor is used as an additional torque source to act in cooperation with, and supplement the torque provided by, engine 10. During the "assist" mode, as in the engine-only mode, fuel is supplied to engine 10 so as to spin the engine fueled and provide torque to the vehicle wheels. In this mode, each of engine torque and motor torque is used to propel the vehicle wheels.

In still another example, the vehicle may be driven in an engine-off mode, herein also referred to as an electric mode, wherein battery-powered electric motor 26 is operated and used as the only source of torque for driving wheels 52. As such, during the engine-off mode, no fuel may be injected into engine 10 irrespective of whether the engine is spinning or not. The "engine-off" mode may be employed, for example, when cruising at steady vehicle speed, during braking, light acceleration at low speeds, while stopped at traffic lights, etc. In this mode, only motor torque is used to propel the vehicle wheels.

Propulsion system 100 may further include a control system including controller 12 configured to receive information from a plurality of sensors 16 (various examples of which are described herein) and sending control signals to a plurality of actuators 81 (various examples of which are described herein). As one example, sensors 16 may include various pressure and temperature sensors, a fuel level sensor, various exhaust gas sensors, and other sensors such as those described with reference to FIG. 2. The various actuators may include, for example, the transmission gear set, cylinder fuel injectors, an air intake throttle coupled to the engine intake manifold, and other actuators such as those described with reference to FIG. 2. Controller 12 may receive input data from the various sensors, process the input data, and trigger the actuators in response to the processed input data based on instruction or code programmed therein corresponding to one or more routines. Example control routines are described herein with regard to FIGS. 3-4.

Figure 2:
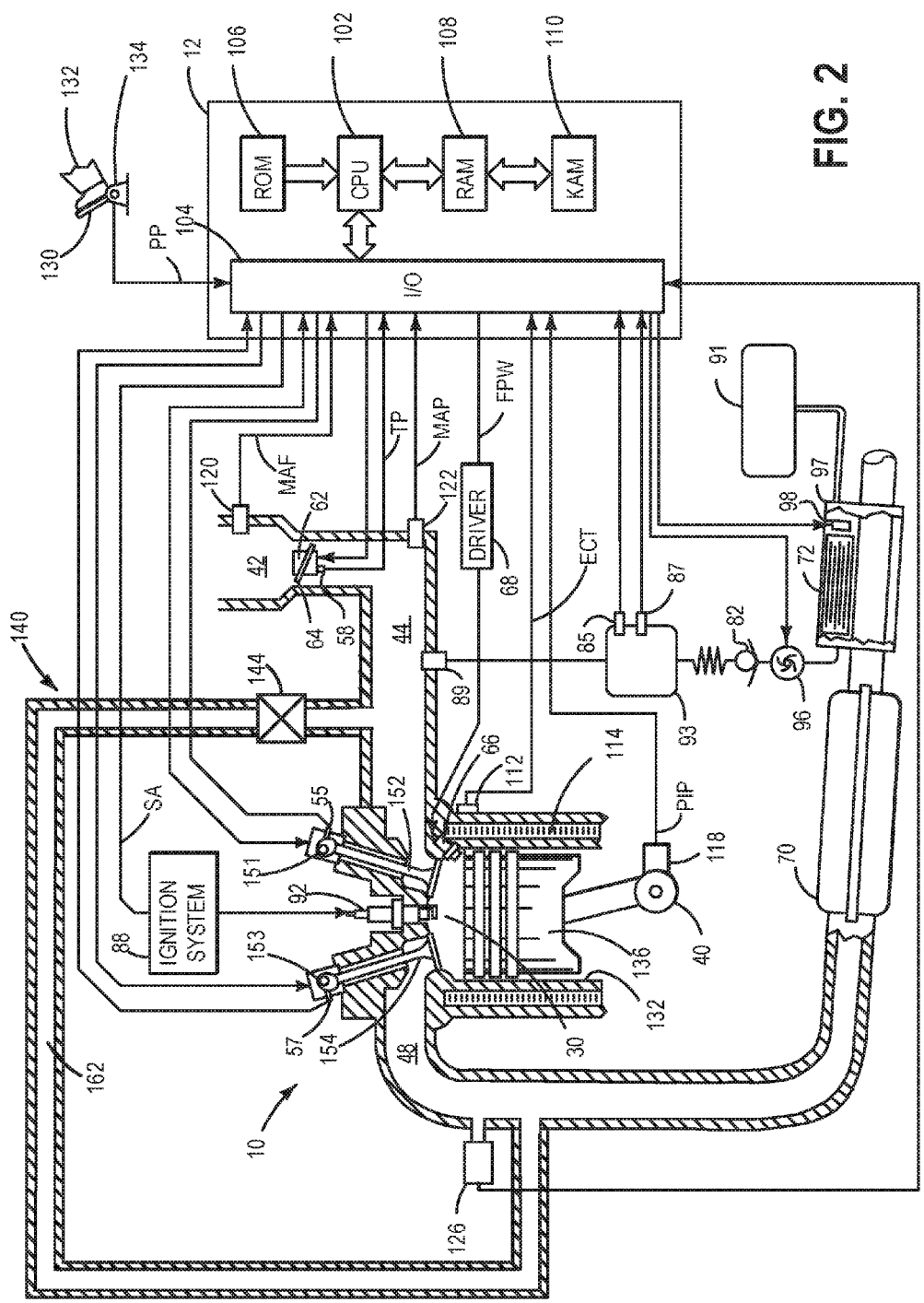
FIG. 2 shows a partial engine view.

Referring now to FIG. 2, one cylinder of internal combustion engine 10 which comprises a plurality of cylinders, as shown in FIG. 1, is depicted. Engine 10 is controlled by electronic engine controller 12. Engine 10 includes combustion chamber 30 and cylinder walls 132 with piston 136 positioned therein and connected to crankshaft 40. Combustion chamber 30 is shown communicating with intake manifold 44 and exhaust manifold 48 via respective intake valve 152 and exhaust valve 154. Each intake and exhaust valve may be operated by an intake cam 151 and an exhaust cam 153. Alternatively, one or more of the intake and exhaust valves may be operated by an electromechanically controlled valve coil and armature assembly. The position of intake cam 151 may be determined by intake cam sensor 55. The position of exhaust cam 153 may be determined by exhaust cam sensor 57.

Intake manifold 44 is shown communicating with intake plenum 42 via optional electronic throttle 62. Throttle plate 64 controls the flow of air through electronic throttle 62.

Intake manifold 44 is also shown coupled to the engine cylinder having fuel injector 66 coupled thereto for delivering liquid fuel in proportion to the pulse width of signal FPW from controller 12. Fuel is delivered to fuel injector 66 by a fuel system including fuel tank 91, fuel pump (not shown), fuel lines (not shown), and fuel rail (not shown). In one example, a low pressure direct injection system may be used, where fuel pressure can be raised to approximately 20-30 bar. Alternatively, a high pressure, dual stage, fuel system may be used to generate higher fuel pressures. The engine 10 is configured such that the fuel is injected directly into the engine cylinder, which is known to those skilled in the art as direct injection. Alternatively, liquid fuel may be port injected wherein fuel is delivered into an intake port, upstream of the intake valve. Fuel injector 66 is supplied operating current from driver 68 which responds to controller 12.

It will also be appreciated that while the depicted embodiment illustrates the engine being operated by injecting fuel via a single direct injector; in alternate embodiments, the engine may be operated by using two or more injectors (for example, a direct injector and a port injector per cylinder, or two direct injectors/two port injectors per cylinder, etc.) and varying a relative amount of injection into the cylinder from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 126. By measuring an amount of residual oxygen (for lean mixtures) or unburned hydrocarbons (for rich mixtures) in the exhaust gas, the sensor may determine the AFR. As such, the AFR may be provided as a Lambda ($\lambda$) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

Gaseous fuel may be injected to intake manifold 44 by way of fuel injector 89. In another embodiment, gaseous fuel may be directly injected into cylinder 30. Gaseous fuel is supplied to fuel injector 89 from storage tank 93 by way of pump 96 and check valve 82. Pump 96 pressurizes gaseous fuel supplied from fuel reformer 97 to storage tank 93. Alternatively, pump 96 may be omitted. Check valve 82 limits flow of gaseous fuel from storage tank 93 to fuel reformer 97 when the output of pump 96 is at a lower pressure than storage tank 93. Fuel reformer 97 includes catalyst 72 and may further include optional electrical heater 98 for reforming alcohol supplied from fuel tank 91.

Fuel tank 91 may be configured to hold alcohol or a mixture of gasoline and alcohol. The liquid fuel may include, for example, a gasoline-alcohol blend, such as E85 (which has 85% ethanol and 15% gasoline), E10 (which has 10% ethanol and 90% gasoline), E10, E22, as well as methanol-gasoline blends. In some embodiments, alcohol may be separated from a gasoline/alcohol mixture before entering fuel reformer 97. Fuel reformer 97 is shown coupled to the exhaust system downstream of catalyst 70 and exhaust manifold 48. However, fuel reformer 97 may be coupled to exhaust manifold 48 and located upstream of catalyst 70. Fuel reformer 97 may use exhaust heat to drive an endothermic reaction of alcohol supplied by fuel tank 91 and to promote fuel reformation (e.g., into a mixture of $H_2$, $CH_4$, and CO).

While the example discusses a liquid fuel being reformed into a gaseous fuel, it will be appreciated that this is not meant to be limiting. As such, the engine may be fueled with a first fuel from a first fuel tank (for spinning the engine) and may reform the first fuel into a second, higher octane fuel which is stored in a second, separate fuel tank. Based on engine operating conditions, the second higher octane fuel may also be injected into the engine (e.g., by itself or along with the first fuel) to provide, in non-limiting examples, improved combustion stability benefits, knock reduction benefits, etc.

By refilling a fuel tank with a liquid fuel and then injecting the liquid fuel into the engine as well as injecting a gaseous reformate derived from the liquid fuel, the engine may be effectively used as a dual fuel engine. The hydrogen content of the reformate improves the combustion stability of the engine when operating on the liquid fuel, thus enabling the engine to operate with a higher charge dilution, which improves fuel economy.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

An exhaust gas recirculation (EGR) system 140 may route a desired portion of exhaust gas from the exhaust pipe 48 to the intake manifold 44 via an EGR passage 162. EGR increases charge dilution and reduces pumping work of an engine resulting in increased fuel economy. In addition, EGR effectively cools combustion chamber temperatures thereby reducing NOx formation and improving emissions quality. EGR may also be used to regulate the temperature of the air-fuel mixture within the combustion chamber, thus providing a method of controlling the timing of ignition during some combustion modes. The opening of EGR valve 144 may be adjust to control the amount and flow rate of the exhaust gas recirculation delivered to the intake manifold. As elaborated herein, during conditions when a larger amount of gaseous fuel/reformate is available, the engine may be operated with gaseous reformate (in addition to the liquid fuel) while operating with a higher charge dilution as provided by increasing the EGR flow to the engine intake.

Controller 12 is shown in FIG. 2 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of fuel reformer tank pressure from pressure sensor 85; a measurement of fuel reformer tank temperature from temperature sensor 87; a measurement of air mass entering the engine from sensor 120; and a measurement of throttle position from sensor 58. Barometric pressure may also be sensed (sensor not shown) for processing by controller 12. Engine position sensor 118 may produce a predetermined number of equally spaced pulses every revolution of the crankshaft from which engine speed (RPM) can be determined.

In some embodiments, the engine may be coupled to an electric motor/battery system in a hybrid vehicle, such as depicted in FIG. 1. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. During the intake stroke, generally, the exhaust valve 154 closes and intake valve 152 opens. Air is introduced into combustion chamber 30 via intake manifold 44, and piston 136 moves to the bottom of the cylinder so as to increase the volume within combustion chamber 30. The position at which piston 136 is near the bottom of the cylinder and at the end of its stroke (e.g., when combustion chamber 30 is at its largest volume) is typically referred to by those of skill in the art as bottom dead center (BDC). During the compression stroke, intake valve 152 and exhaust valve 154 are closed. Piston 136 moves toward the cylinder head so as to compress the air within combustion chamber 30. The point at which piston 136 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 136 back to BDC. Crankshaft 40 converts piston movement into a rotational torque of the crankshaft. Finally, during the exhaust stroke, the exhaust valve 154 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

The controller 12 receives signals from the various sensors of FIGS. 1-2 and employs the various actuators of FIGS. 1-2 to adjust engine operation based on the received signals and instructions stored on a memory of the controller. For example, based on signals from the controller, a speed ratio of the transmission of FIG. 1 may be varied to alter an engine speed-load profile at a given power output. As another example, responsive to a low availability of gaseous fuel, engine output may be increased to raise a temperature of the engine exhaust, which drives more liquid fuel reforming at the reformer.

Non-transitory storage medium read-only memory 110 can be programmed with computer readable data representing instructions executable by processor 106 for performing the methods described below as well as other variants that are anticipated but not specifically listed.

In this way the systems of FIGS. 1-2 provides for a hybrid vehicle system comprising: an engine including an intake and an exhaust; an EGR passage including an EGR valve coupling the exhaust to the intake; a first fuel injector for delivering a liquid fuel from a first fuel tank into the engine; a second fuel injector for delivering a gaseous fuel from a second fuel tank into the engine; an electric motor driven by a battery; a continuously variable transmission; a reformer coupled to the engine exhaust; and a controller. The controller may be configured with computer readable instructions stored on non-transitory memory for: operating the reformer to reform at least a portion of the liquid fuel into the gaseous fuel; responsive to a first drop in demanded torque while a level of the gaseous fuel in the second tank is higher than a threshold level, transitioning to propelling the vehicle using motor torque at a first engine load; and responsive to a second drop in demanded torque while a level of the gaseous fuel in the second tank is lower than the threshold level, transitioning to propelling the vehicle using motor torque at a second engine load higher than the first load when a state of charge of the battery is higher than a threshold charge; and when the state of charge of the battery is lower than the threshold charge, raising the engine load to provide higher than demanded torque while using excess torque to charge the battery. The controller may include further instructions for: during the first drop in demanded torque, shutting down the engine while maintaining reformer operation until exhaust temperature is lower than a threshold temperature, the threshold temperature based on the level of the gaseous fuel in the second tank. The controller may include further instructions for adjusting a degree of raising the engine load based on the level of the gaseous fuel relative to the threshold level, the engine load raised by adjusting a speed ratio of the CVT; and while operating the engine, adjusting the EGR valve to increase cylinder charge dilution as the level of the gaseous fuel increases, and decrease the cylinder charge dilution as the level of the gaseous fuel decreases.

Figure 3:
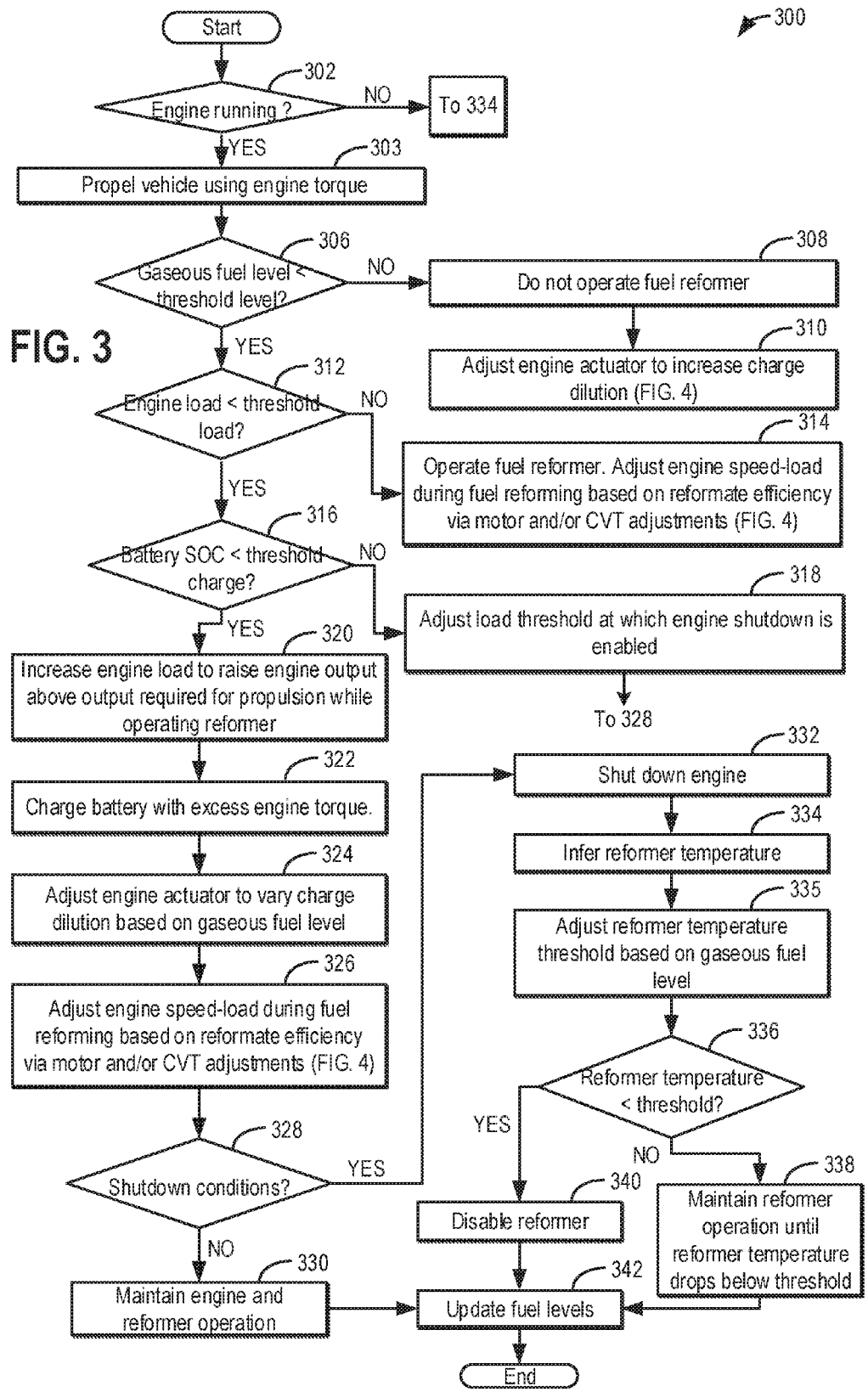
FIG. 3 shows a high level flow chart for coordinating fuel reforming with engine and motor operations in a hybrid vehicle.

Now turning to FIG. 3, an example routine 300 is described for coordinating adjustments to engine operation based on gaseous fuel generated at a fuel reformer and further based on hybrid vehicle conditions. The method enables fuel reformer technology to be integrated with hybrid vehicle technology to achieve synergistic fuel economy benefits. While the example is depicted with reference to a gaseous fuel reformed from a liquid fuel, the engine then operating with one or both of the liquid fuel and the gaseous fuel, it will be appreciated that in alternate examples, the engine may be operating on a first, lower octane fuel that is reformed into a second, higher octane fuel component, the engine then operating with one or both of the lower octane fuel and the higher octane fuel. Instructions for carrying out method 300 and the rest of the methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below. As an example, the controller may adjust the opening of an EGR valve based on an amount of fuel reformed by the reformer.

At 302, the method includes confirming that the engine is running (that is, spinning fueled with cylinders combusting). In one example, the engine may be running when the hybrid vehicle is operating in an engine mode, such as when torque demand is higher than a threshold or when a battery state of charge is lower. As such, the engine may be running with a liquid fuel being injected into the engine cylinders. If the engine is not running, the hybrid vehicle may be in an electric mode. Accordingly, the method includes propelling the vehicle using motor torque. In addition, the method moves to 334 to determine whether to operate the fuel reformer while the engine is shut down based on reformer temperature. As elaborated below, if the reformer temperature, as inferred based on fuel flow through the reformer and exhaust temperature, is too low, the fuel reformer coupled to the engine exhaust may be disabled. Else, if the reformer is hot enough, even though the engine is not operated, the fuel reformer may be maintained active and fuel may continue to be reformed.

If the engine is running, at 303, the method includes propelling the vehicle using engine torque. At 306, an amount of gaseous fuel (herein also referred to as reformate or a higher octane fuel) available in a fuel tank may be determined. For example, it may be determined if the gaseous fuel level is below a threshold level. If not, that is if there is a higher than threshold level of gaseous fuel available, then at 308, the method includes propelling the vehicle using engine torque. In addition, since sufficient gaseous fuel is available, the fuel reformer coupled to the engine exhaust may not be operated. That is, responsive to available reformate being higher than a threshold level, the reformer is disabled.

In the present system, in addition to liquid fuel being injected into the engine cylinders to spin the engine, a gaseous fuel reformed from the liquid fuel at the fuel reformer may also be opportunistically injected into the engine cylinders to improve engine performance. As an example, the engine may be operated with a liquid ethanol-gasoline blend (such as E85) delivered to engine cylinders from a first fuel tank. The ethanol-gasoline blend may be separated into ethanol and gasoline fractions (e.g., in situ in the tank), and the ethanol fraction may be reformed to generate hydrogen gas which is stored in a dedicated tank (a second fuel tank separate from the first fuel tank). Hydrogen may be added back into the engine, when required (such as when operating closer to combustion stability limits). In one example, gaseous fuel usage may be increased during an engine cold-start to improve engine warm-up. As such, the use of gaseous fuel during cold-start conditions may result in improve mixture homogeneity and air-fuel ratio control. In addition, catalyst light-off may be expedited. The faster catalyst light-off with decreased need for spark retard (enabled through improved combustion stability with hydrogen in the gaseous fuel) may also improve cold-start exhaust emissions.

Also, in response to the availability of reformate, at 310, an engine actuator may be adjusted to vary cylinder charge dilution. The adjusting may include increasing the cylinder charge dilution as the available reformate increases (e.g., as the available reformate level exceeds the threshold level). The actuator may include one or more of an EGR valve coupled in an EGR passage (between the engine intake manifold and exhaust manifold), and a variable cam timing (VCT) actuator. As an example, the controller may send a signal to the VCT actuator to advance or retard the timing relative to a current timing to increase the charge dilution. As another example, the controller may send a signal to an actuator coupled to the EGR valve to move the valve to a more open position, thereby increasing EGR flow/amount, and raising charge dilution. Charge dilution adjustments are further elaborated with reference to FIG. 4.

If the available reformate is lower than the threshold level, then at 312 it may be determined if there is a drop in engine load to lower than a threshold load. In one example, the drop in engine load may be responsive to a drop in driver demand. As such, since the endothermic reformer operation is driven by exhaust temperature, reformer operation may not be sufficiently supported at lower engine loads. If the engine load has not dropped, than at 314, the method includes operating the fuel reformer using engine exhaust energy to raise the available amount of gaseous fuel. In particular, reformer operation may be increased to reform a fuel available in the fuel tank into a high octane fuel (such as a gaseous hydrogen fuel generated from an ethanol-gasoline blend) which is stored in a dedicated fuel tank. A degree of increasing the reformer operation responsive to the higher than threshold load may be based on the available reformate (amount or level).

In addition, an engine speed-load profile may be adjusted during the fuel reforming based on reformer efficiency. As elaborated with reference to FIG. 4, the motor and/or the CVT transmission of the hybrid vehicle may be advantageously used to keep the speed/load of the engine in a narrow operating range corresponding to optimal reformer efficiency even as driver demand varies. Gaseous fuel levels may be updated responsive to reformer operation.

In this way, responsive to higher than threshold engine load, reformer operation is increased, a degree of the increasing based on the available reformate, and responsive to lower than threshold engine load while available reformate is higher than the threshold level, the reformer is disabled.

Returning to 312, if there is a drop in engine load, then at 316, the method estimates a charge level of a system energy storage device, such as a system battery state of charge (SOC). If the battery state of charge is higher than a threshold, that is, the battery is not capable of accepting charge, then the method proceeds to 318 wherein a load threshold at which engine shutdown is enabled is adjusted. In other words, an engine load below which an engine shutdown is initiated may be adjusted, for example, the load may be raised. As such, this minimizes engine operation in the low load since the low loads do not benefit the fuel reformer due to the associated lower exhaust temperatures. Adjusting the load also increases electric operation of the hybrid vehicle at the low loads such that lack of fuel reformation coincides with vehicle operation where gaseous fuel usage is not required. From 318, the method moves to 328, as elaborated below, wherein an engine shutdown is initiated at the adjusted load and the vehicle is propelled with motor torque.

If the battery SOC is lower than the threshold (as estimated at 316), that is, if the battery is capable of accepting charge, then the method proceeds to 320 wherein responsive to the lower than threshold engine load while the available reformate is lower than the threshold level, engine load is raised above the threshold load. In particular, engine load is increased to raise engine output above the output required for vehicle propulsion while concurrently using engine exhaust energy to drive the fuel reformer and reform a liquid fuel. Herein by raising the engine load above the load required to propel the vehicle, high engine load operation can be maximized since the higher loads benefit the fuel reformer due to the associated higher exhaust temperatures. The engine may then be operated with the raised load until the available reformate is higher than the threshold level (that is, the engine may be operated with the higher load for at least a duration until the reformate has been sufficiently replenished). A degree of raising the engine load may also be based on the available reformate relative to the threshold level, the degree of raising the engine load may be increased as the available reformate drops below the threshold level. The degree of raising may be further based on a reformer temperature. For example, as the reformer temperature decreases (such as below a temperature corresponding to optimal reformer efficiency), the degree of raising the engine load may be increased. As fuel is reformed, an estimate of the available reformate may be updated. At 322, the method includes charging the system battery using the excess engine torque (in excess of that required for propelling the vehicle).

At 324, as at 310, an engine actuator may be adjusted to vary cylinder charge dilution based on the available reformate. The adjusting may include increasing the cylinder charge dilution as the available reformate increases, and decreasing the cylinder charge dilution as the available reformate decreases. The actuator may include one or more of the EGR valve and a VCT timing. Charge dilution adjustments are further elaborated with reference to FIG. 4.

In some examples (as elaborated at FIG. 4), in response to a lower than threshold reformer efficiency, the engine actuator may be further adjusted to reduce the charge dilution. As such, this is expected to improve the reformer efficiency. However, if the reformer efficiency does not improve, it may be inferred that there is a reformer degradation and reformate usage may be reduced (or discontinued). Thus in response to a lack of improvement in reformer efficiency after reducing the charge dilution, the controller may reduce usage of the reformate. As such, this also allows the remaining reformate to be conserved.

At 326, as at 314, an engine speed-load profile may be adjusted during the fuel reforming based on reformer efficiency. As elaborated with reference to FIG. 4, the motor and/or the CVT transmission of the hybrid vehicle may be advantageously used to keep the speed/load of the engine in a narrow operating range corresponding to optimal reformer efficiency even as driver demand varies. In particular, the engine may be operated at an adjusted speed-load, the speed-load adjusted based on reformer efficiency and reformer temperature. In one example, the vehicle includes a continuously variable transmission coupled to the engine and operating the engine at the adjusted engine speed-load includes selecting a CVT speed ratio matching the adjusted engine speed-load. In addition, while operating the engine with the raised load, a rate of charging the system battery may be adjusted based on the adjusted engine speed-load to maintain a power level of the vehicle.

At 328, it may be determined if engine shutdown conditions are met. In one example, engine shutdown conditions are met when a driver demand drops, when a shutdown request is received, or when the vehicle is moved to an electric mode. If engine shutdown conditions are not met, at 330 engine and fuel reformer operation is continued at 330. At 332, in response to the shutdown request, the method includes shutting down the engine while continuing to reform the liquid fuel until the reformer temperature falls below a threshold temperature. In conventional engine systems, a fuel reformer is shutdown when the engine is shutdown. However, the inventors have recognized that in a hybrid vehicle, for a duration after the engine is shutdown, the reformer may stay warm enough to continue fuel reforming efficiently. Thus, by delaying reformer shutdown after engine shutdown based on reformer temperature, additional fuel reforming can be achieved. Accordingly, at 334, the method includes measuring or inferring the reformer temperature. In one example, the reformer temperature may be measured by a temperature sensor coupled to the reformer. In another example, reformer temperature may be inferred based on one or more or each of a fuel flow rate through the reformer and engine exhaust temperature. Therein, the reformer temperature may increase as exhaust temperature increases (due to increased heat exchange) and the reformer temperature may decrease as fuel flow increases.

Additionally, the acceptable temperature range for reformer operation may be adjusted based on a gaseous fuel level in the buffer fuel tank. For example, at 335, the method may include adjusting the threshold temperature for the reformer based on the available reformate, the threshold temperature lowered as the available reformate decreases. As such, if there is sufficiently available reformate, the threshold may remain unadjusted, or may be adjusted to be higher. At 336, the method includes comparing the measured or inferred reformer temperature to the adjusted threshold temperature. If the reformer temperature is above the threshold temperature, reformer operation may be maintained at 338. Else, if the reformer temperature is below the threshold temperature, reformer operation may be disabled at 340. From each of 330, 338, and 340, the method may move to 342 to update the reformate level (e.g., the gaseous fuel level in the buffer tank). Thus, following an engine shutdown, the reformer may be allowed to continue operating longer, and may be disabled when the reformer drops to a lower (colder) temperature when the available gaseous fuel is lower. In comparison, the reformer may be disabled at a higher temperature when the available gaseous fuel is higher. In this way, even after an engine shutdown, reformer operation may be continued, while possible, to replenish reformate.

Figure 4:
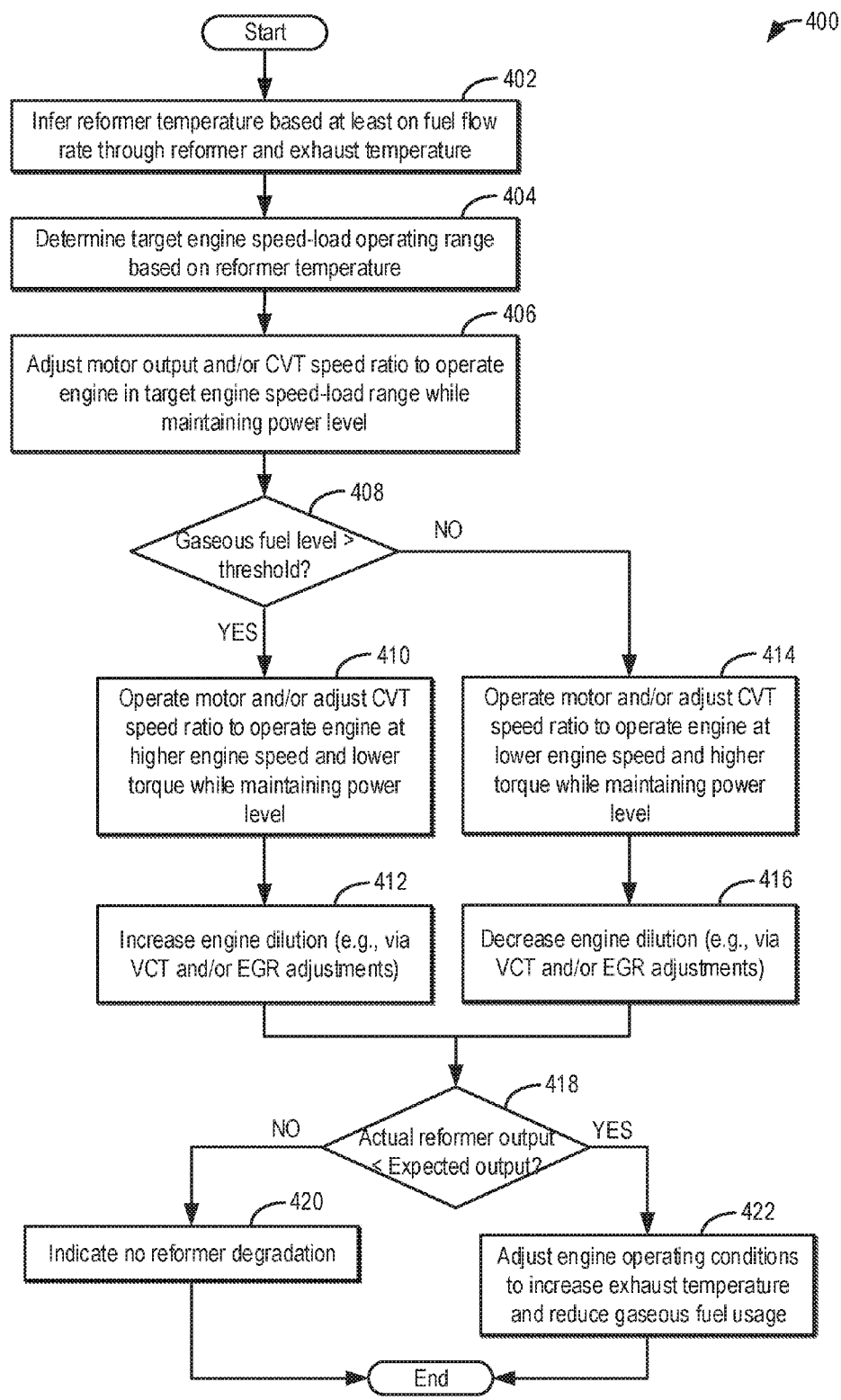
FIG. 4 shows a high level flow chart for using a motor to operate an engine in a selected speed-load range based on reformer efficiency.
Figure 5:
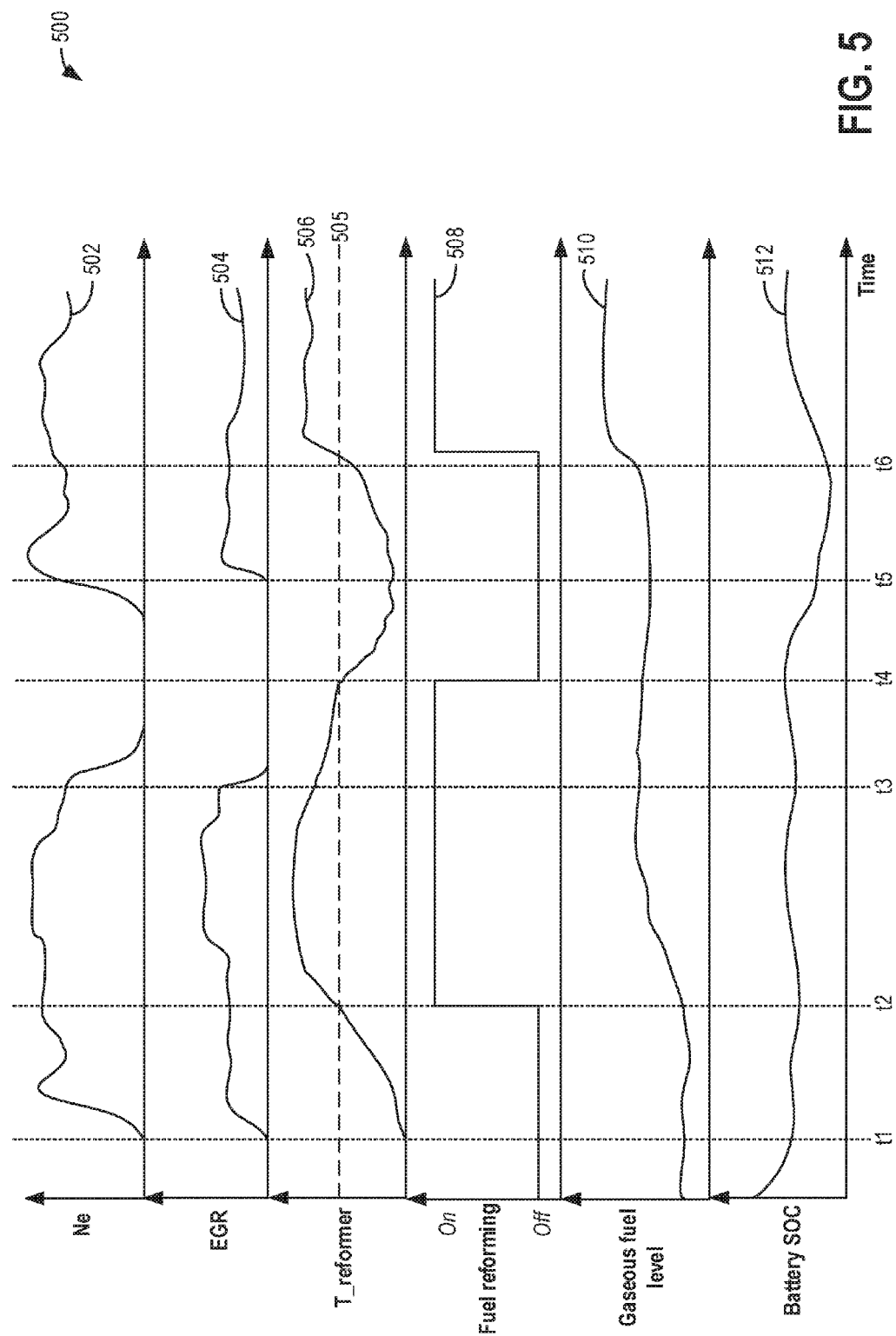
FIG. 5 shows example fuel reforming adjustments during operation of a hybrid vehicle system.

Turning now to FIG. 4, an example method 400 is shown for adjusting an engine speed-load profile during reformer operation to improve reformer efficiency while maintaining a power level of a hybrid vehicle. The method enables engine operation to be held in a narrow range where the reformer is efficient even as driver demand changes. The steps of method 400 may be performed as part of the routine of FIG. 3, such as at 310, 314, and 326. It will be appreciated that the steps of method 400 may be performed while a reformer is enabled and reforming a liquid fuel into a higher octane gaseous fuel.

At 402, the method includes estimated and/or measuring a reformer temperature. In one example, the reformer temperature may be measured by a dedicated temperature sensor coupled to the reformer. In another example, the reformer temperature may be inferred based on one or more or each of a fuel flow rate through the reformer and engine exhaust temperature. As such, the reformer efficiency varies with temperature, which is affected by both exhaust temperature (through a heat exchanger) and by the flow rate of fuel flowing through the reformer. In particular, the reformer temperature increases as exhaust temperature increases. While the gasoline component of the liquid fuel does not react at the reformer (only the ethanol/alcohol component does), it cools down the reformer. Thus the reformer temperature decreases as fuel flow there-through increases.

At 404, the method includes determining a target engine speed-load operating range based on reformer temperature. For example, the controller may refer a look-up table stored in the controller's memory to determine the target engine speed-load operating range based on the reformer temperature. As such, for a given reformer temperature, the target engine speed-load may correspond to a narrow operating range where reformer operation is optimal (has highest reforming efficiency). In one example, as the reformer temperature increases, the target engine speed-load may shift towards a higher engine speed range and a lower engine load range, or a lower engine speed range and a higher engine load range.

At 406, the controller may maintain the engine in the target engine speed-load range by leveraging the hybrid components of the hybrid vehicle while also maintaining the power level demanded by the driver. In particular, the method includes one or more of adjusting a motor output (e.g., motor torque output and/or battery charging/discharging rate via the motor) and a speed ratio of a CVT transmission coupled between the engine and the vehicle wheels to operate the engine in the target speed-load range while maintained vehicle power. By operating the engine in the narrow operating range during fuel reforming, reformer function is improved. In one example, the CVT speed ratio may be adjusted to a speed ratio that provides the target speed-load. In another example, a rate of battery charging/discharging may be adjusted to a rate that provides the target speed-load of the engine. In yet another example, motor torque output by the motor may be adjusted while the engine is held at the target speed-load so that any transients are addressed via the motor while a power level of the vehicle also is maintained despite changes in driver demand.

At 408, a fuel level of the reformate may be assessed and it may be determined if it is above a threshold level. For example, it may be determined if the gaseous fuel available in the buffer tank is above the threshold level. If yes, then at 410, the method includes further adjusting the target engine speed-load via adjustments to the motor and/or the CVT speed ratio to operate the engine at a higher speed and lower torque while maintaining the power level. In addition, at 412, engine charge dilution is increased (via adjustments to an EGR valve and/or a VCT actuator, for example). Herein, due to the higher gaseous fuel availability, the engine can be operated at the higher speed where the engine is more tolerant of the higher dilution.

If the gaseous fuel available in the buffer tank is below the threshold level, then at 414, the method includes further adjusting the target engine speed-load via adjustments to the motor and/or the CVT speed ratio to operate the engine at a lower speed and higher torque while maintaining the power level. In addition, at 416, engine charge dilution is decreased (via adjustments to an EGR valve and/or a VCT actuator, for example). Herein, due to the lower gaseous fuel availability, the engine is shifted to the lower speed where the engine is more tolerant of the lower dilution.

From each of 412 and 416, the method moves to 418 to determine if the actual output at the reformer is lower than the expected output. In one example, this may be confirmed responsive to a lower than expected reformer pressure or lower than expected amount of reformate being produced (or lower than expected rise in reformate level). If the actual output of the reformer is not lower than the expected output, then at 420, no reformer degradation may be indicated. If the actual output of the reformer is lower than the expected output, then at 422, controller may change one or more engine operating conditions to try to improve the reformer output. As one example, the controller may reduce the charge dilution through the use of reduced EGR and/or VCT adjustments to raise the exhaust temperature. As such, a higher exhaust temperature may be expected to improve the reformer output. As another example, the controller may also reduce the usage of the gaseous fuel. In another example, in response to the lower than threshold reformer efficiency, an engine actuator (e.g., EGR valve or VCT actuator) may be adjusted to reduce the charge dilution. However, if the reformer efficiency does not improve following the reduction in charge dilution and increase in exhaust temperature, it may be inferred that the reformer is degraded and then reformate usage may be reduced (or discontinued). Thus in response to a lack of improvement in reformer efficiency after reducing the charge dilution, the controller may reduce usage of the reformate. As such, this allows the remaining reformate to be conserved.

In this way, during operation of a hybrid vehicle, a controller may be configured to operate an engine with a first fuel while concurrently reforming the first fuel into a gaseous fuel at a reformer driven by engine exhaust energy; and in response to an engine shutdown request, the controller may shut down the engine while continuing to reform the first fuel until a reformer temperature is below a threshold. Herein, the threshold may be adjusted based on an available amount of the gaseous fuel, the threshold lowered as the available amount decreases. Operating the engine while reforming the first fuel may include operating the engine at an adjusted engine speed-load, the adjusted engine speed-load based on one or more of the reformer temperature and the available amount of the gaseous fuel. In one example, the vehicle includes a continuously variable transmission coupled between the engine and vehicle wheels, and operating the engine at the adjusted engine speed-load includes selecting a CVT speed ratio matching the adjusted engine speed-load. The adjusted engine speed-load includes an engine torque in excess of engine torque required to propel the vehicle, the controller further charging a system battery with the excess torque. In addition, while operating the engine at the adjusted engine speed-load, the controller may use motor torque from a motor to maintain a power level of the vehicle at an operator demanded power level. The controller may also adjust an engine actuator to vary cylinder charge dilution in response to the available amount of the gaseous fuel, the actuator including one or more of an EGR valve and a variable cam timing actuator, wherein the adjusting includes increasing an opening of the EGR valve and/or adjusting (e.g., advancing/retarding) the variable cam timing as the available amount of the gaseous fuel increases. In addition, as more EGR is used, spark timing may be advanced. Likewise, as usage of the less volatile fuel is increased, spark timing may be advanced (and spark advance usage may be increased) and EGR usage may be decreased. As another example, as usage of the more volatile fuel is increased, spark advance usage may be decreased and EGR usage may be increased.

Now turning to FIG. 5, example adjustments to an engine and reformer operation in a hybrid vehicle are shown. Map 500 depicts engine speed at plot 502, EGR flow at plot 504, reformer temperature (T_reformer) at plot 506, fuel reforming (enabled or disabled) at plot 508, a level of gaseous fuel in a buffer tank at plot 510, and a battery state of charge at plot 512. All plots are shown over time along the x-axis.

Prior to time t1, the engine may be shut-down and the vehicle is operating in the electric mode with the vehicle being propelled via motor torque, as reflected by a drop in battery state of charge. At this time, the fuel reformer is also disabled and no fuel reforming is occurring.

At t1, in response to a change in driver demand, the hybrid vehicle may shift from the electric mode to the engine mode wherein the vehicle is propelled with engine torque. At t1, the engine is restarted. However, the engine output is not high enough to provide an exhaust temperature that supports reformer operation. Therefore, the reformer is maintained disabled. At this time, the engine is operated with charge dilution provided based on the engine load and the available gaseous fuel via adjustments to an EGR flow.

At t2, in response to the exhaust temperature, and thereby the reformer temperature, exceeding threshold 505, reformer operation is enabled. As a result, gaseous fuel levels in the fuel tank start to increase and also gaseous fuel usage (alongside liquid fuel usage in the engine) is also increased. In view of the increased gaseous fuel availability and usage, the engine charge dilution is increased by delivering more EGR. Additionally, to improve the reformer power efficiency, the engine may be operated at a higher speed and lower torque while operating with the higher charge dilution for a duration. The higher engine speed and lower torque may be maintained via adjustments to a motor output and a rate of battery charging so that the engine is operated in a narrow operating range where in addition to elevated EGR tolerance, the reformer efficiency is optimized. After the duration, once the gaseous fuel level has increased by an amount, the engine speed may be decreased.

At t3, an engine shutdown request is received in response to which the engine is shutdown and EGR delivery is discontinued. At this time the vehicle is propelled using motor torque. When the engine is shutdown, the reformer is hot enough (above threshold 505) to continue reforming fuel efficiently. Therefore, the reformer is not disabled at t3 and reformer operation is continued. At t4, when the reformer temperature drops to threshold 505, it may be determined that the reformer is not warm enough, and therefore the reformer is disabled. In alternate examples, threshold 505 may be adjusted at t3 during the engine shutdown based on the amount of gaseous fuel available in the buffer tank so that reformer operation can be continued until a threshold amount of fuel has been stored.

Between t4 and t5, the vehicle is continued to be operated with motor torque. Shortly before t5, the engine is restarted. At t5, EGR delivery is resumed. In addition, the engine may be operating with gaseous fuel added when possible. Due to the reformer temperature being below threshold 505, the reformer is maintained disabled. Herein, after the restart, between t5 and t6, the engine is operated at a low speed-load due to lower driver demand. As such, if the engine remained in this lower load region, reformer operation would not be possible for an extended duration due to insufficient exhaust heat, and reformed fuel benefits would not be achieved. In order to overcome this issues, at t6, the engine speed and load is increased in excess of the what is required to propel the vehicle and meet the driver demand, the torque in excess of the demand being used to charge the system battery (which starts to increase). The increased engine speed-load enables the exhaust temperature, and therefore the reformer temperature, to be rapidly raised, expediting reformer operability. Once a threshold amount of fuel has been reformed, the raising of engine speed-load above a level based on driver demand is discontinued. The engine speed-load is returned to the level based on driver demand and the battery charging rate may be reduced.

In this way, a fuel reformer may be integrated into a hybrid vehicle to provide additional fuel economy benefits (e.g., a 2-3% improvement in fuel economy). By adjusting charge dilution based on reformate availability, reformate usage may be increased, improving combustion stability and engine performance. By maximizing high engine load operation and minimizing low load operation via adjustments to an engine load, a battery charging rate and/or a threshold load at which an engine is shutdown, higher exhaust temperatures that enable reformer operation may be provided for a longer time. In addition, reformer efficiency may be maintained elevated. In one example, the conversion of exhaust heat into chemical energy at the reformer provides an additional 0.7-1% fuel economy benefit. By using the motor of the hybrid vehicle and/or a CVT transmission to hold engine operation in a narrow operating range where reformer efficiency is optimal while also maintaining a power level, even as driver demand changes, the benefits of the reformer system may be extended over a wider range of vehicle operation. By enhancing reformate generation and usage over a larger range of vehicle operating conditions, engine combustion stability may be improved and EGR usage can be increased, which provides fuel economy and emissions benefits. Overall, vehicle performance and fuel economy can be improved through synergistic benefits of hybrid vehicle technology and fuel reforming technology.

One example method for a hybrid vehicle comprises: responsive to lower than threshold engine load while an available reformate is lower than a threshold level, raising engine load above the threshold load and charging a system battery using excess engine torque; and reforming a liquid fuel using exhaust energy, the engine operated with the raised load until the available reformate is higher than the threshold level. In the preceding example, additionally or optionally, a degree of raising the engine load is based on the available reformate relative to the threshold level, and further based on reformer temperature. In any or all of the preceding examples, additionally or optionally the method further comprises, in response to an engine shutdown request, shutting down the engine while continuing to reform the liquid fuel until the reformer temperature is below a threshold temperature. In any or all of the preceding examples, additionally or optionally, the threshold temperature is adjusted based on the available reformate, the threshold temperature lowered as the available reformate decreases. In any or all of the preceding examples, additionally or optionally, the engine operated with the raised load includes the engine operated at an adjusted engine speed-load based on the reformer temperature, and wherein a rate of charging the system battery is adjusted based on the adjusted engine speed-load to maintain a power level of the vehicle. In any or all of the preceding examples, additionally or optionally, the vehicle includes a continuously variable transmission (CVT) coupled to the engine, and wherein operating the engine at the adjusted engine speed-load includes selecting a CVT speed ratio matching the adjusted engine speed-load. In any or all of the preceding examples, additionally or optionally, the reformer temperature is inferred based on each of a fuel flow rate through the reformer and engine exhaust temperature. In any or all of the preceding examples, additionally or optionally the method further comprises, adjusting an engine actuator to vary cylinder charge dilution in response to the available reformate, the actuator including one or more of an EGR valve and a variable cam timing actuator, the adjusting including increasing the cylinder charge dilution as the available reformate increases. In any or all of the preceding examples, additionally or optionally the method further comprises, in response to a lower than threshold reformer efficiency, further adjusting the engine actuator to reduce the charge dilution, and in response to a lack of improvement in reformer efficiency after reducing the charge dilution, reducing usage of the reformate. In any or all of the preceding examples, additionally or optionally the method further comprises, responsive to higher than threshold engine load, increasing reformer operation, a degree of the increasing based on the available reformate, and responsive to lower than threshold engine load while available reformate is higher than the threshold level, disabling the reformer.

Another example method for a hybrid vehicle comprises: operating an engine with a first fuel while concurrently reforming the first fuel into a gaseous fuel at a reformer driven by engine exhaust energy; and in response to an engine shutdown request, shutting down the engine while continuing to reform the first fuel until a reformer temperature is below a threshold. In the preceding example, additionally or optionally, the threshold is adjusted based on an available amount of the gaseous fuel, the threshold lowered as the available amount decreases. In any or all of the preceding examples, additionally or optionally, operating the engine while reforming the first fuel includes operating the engine at an adjusted engine speed-load, the adjusted engine speed-load based on one or more of the reformer temperature and the available amount of the gaseous fuel. In any or all of the preceding examples, additionally or optionally, the vehicle includes a continuously variable transmission coupled between the engine and vehicle wheels, and wherein operating the engine at the adjusted engine speed-load includes selecting a CVT speed ratio matching the adjusted engine speed-load. In any or all of the preceding examples, additionally or optionally, the adjusted engine speed-load includes an engine torque in excess of engine torque required to propel the vehicle, the method further comprising charging a system battery with the excess torque. In any or all of the preceding examples, additionally or optionally the method further comprises, while operating the engine at the adjusted engine speed-load, using motor torque from a motor to maintain a power level of the vehicle at an operator demanded power level. In any or all of the preceding examples, additionally or optionally the method further comprises, adjusting an engine actuator to vary cylinder charge dilution in response to the available amount of the gaseous fuel, the actuator including one or more of an EGR valve and a variable cam timing actuator, and wherein the adjusting includes increasing an opening of the EGR valve and/or adjusting (e.g., advancing/retarding) the variable cam timing as the available amount of the gaseous fuel increases.

Another example hybrid vehicle system comprises: an engine including an intake and an exhaust; an EGR passage including an EGR valve coupling the exhaust to the intake; a first fuel injector for delivering a liquid fuel from a first fuel tank into the engine; a second fuel injector for delivering a gaseous fuel from a second fuel tank into the engine; an electric motor driven by a battery; a continuously variable transmission; a reformer coupled to the engine exhaust; and a controller. The controller may be configured with computer readable instructions stored on non-transitory memory for: operating the reformer to reform at least a portion of the liquid fuel into the gaseous fuel; responsive to a first drop in demanded torque while a level of the gaseous fuel in the second tank is higher than a threshold level, transitioning to propelling the vehicle using motor torque at a first engine load; and responsive to a second drop in demanded torque while a level of the gaseous fuel in the second tank is lower than the threshold level, transitioning to propelling the vehicle using motor torque at a second engine load higher than the first load when a state of charge of the battery is higher than a threshold charge; and when the state of charge of the battery is lower than the threshold charge, raising the engine load to provide higher than demanded torque while using excess torque to charge the battery. In any or all of the preceding examples, additionally or optionally the controller includes further instructions for: during the first drop in demanded torque, shutting down the engine while maintaining reformer operation until exhaust temperature is lower than a threshold temperature, the threshold temperature based on the level of the gaseous fuel in the second tank. In any or all of the preceding examples, additionally or optionally the controller includes further instructions for adjusting a degree of raising the engine load based on the level of the gaseous fuel relative to the threshold level, the engine load raised by adjusting a speed ratio of the CVT; and while operating the engine, adjusting the EGR valve to increase cylinder charge dilution as the level of the gaseous fuel increases, and decrease the cylinder charge dilution as the level of the gaseous fuel decreases.

In a further representation, a method for a hybrid vehicle comprises: operating a fuel reformer using engine exhaust to reform a liquid fuel into a gaseous fuel; operating the engine with the liquid fuel and optionally with the gaseous fuel, wherein the engine is operated at an adjusted engine speed-load where reformer efficiency is higher than a threshold, the reformer efficiency estimated based on a flow rate of liquid fuel through the reformer and exhaust temperature. Herein, the engine is maintained at the adjusted engine speed-load via adjustments to a speed ratio of a CVT coupled to the engine. Alternatively, the engine may be coupled to a battery-driven motor and the engine is maintained at the adjusted engine speed-load via adjustments to a rate of charging/discharging of the system battery. While operating the engine at the adjusted engine speed-load, a power level of the vehicle may be maintained.

In yet another representation a controller may compare a reformer efficiency at a current engine speed-load to reformer efficiency at an adjusted engine speed-load; and in response to a higher than threshold improvement in the reformer efficiency at the adjusted engine speed-load, the engine may be transitioned to the adjusted engine speed-load while maintaining a power level using a system motor. Maintaining a power level using a system motor includes adjusting a motor torque output of an electric motor coupled to the engine and the vehicle wheels, and/or adjusting a rate of charging/discharging of a battery coupled to the motor. Else, in response to a lower than threshold improvement in the reformer efficiency, a current unadjusted engine speed-load may be maintained.

In still another representation, a method for hybrid vehicle including an engine coupled to a reformer, the engine further coupled to an electric motor, comprises: during a first condition, transitioning from propelling the vehicle using engine torque to propelling via motor torque responsive to engine load being lower than a first threshold; and during a second condition, transitioning from propelling the vehicle using engine torque to propelling via motor torque responsive to engine load being lower than a second threshold higher than the first threshold, wherein the transitioning is based on available reformate in a buffer tank. During the first condition, the reformate level is lower and during the second condition, the reformate level is higher. Further, the second threshold may be raised relative to the first threshold as the reformate level in the buffer tank falls below a threshold level.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid vehicle, comprising:
responsive to lower than threshold engine load while an available reformate is lower than a threshold level,
raising engine load above the threshold load and charging a system battery using excess engine torque; and
reforming a liquid fuel using exhaust energy, the engine operated with the raised engine load until the available reformate is higher than the threshold level.

2. The method of claim 1, wherein a degree of raising the engine load is based on the available reformate relative to the threshold level, and further based on reformer temperature.

3. The method of claim 2, further comprising, in response to an engine shutdown request, shutting down the engine while continuing to reform the liquid fuel until the reformer temperature is below a threshold temperature.

4. The method of claim 3, wherein the threshold temperature is adjusted based on the available reformate, the threshold temperature lowered as the available reformate decreases.

5. The method of claim 2, wherein the engine operated with the raised engine load includes the engine operated at an adjusted engine speed-load based on the reformer temperature, and wherein a rate of charging the system battery is adjusted based on the adjusted engine speed-load to maintain a power level of the vehicle.

6. The method of claim 5, wherein the vehicle includes a continuously variable transmission (CVT) coupled to the engine, and wherein operating the engine at the adjusted engine speed-load includes selecting a CVT speed ratio matching the adjusted engine speed-load.

7. The method of claim 2, wherein the reformer temperature is inferred based on each of a fuel flow rate through the reformer and engine exhaust temperature.

8. The method of claim 1, further comprising adjusting an engine actuator to vary cylinder charge dilution in response to the available reformate, the actuator including one or more of an EGR valve and a variable cam timing actuator, the adjusting including increasing the cylinder charge dilution as the available reformate increases.

9. The method of claim 8, further comprising, in response to a lower than threshold reformer efficiency, further adjusting the engine actuator to reduce the cylinder charge dilution, and in response to a lack of improvement in reformer efficiency after reducing the cylinder charge dilution, reducing usage of the reformate.

10. The method of claim 1, further comprising, responsive to higher than threshold engine load, increasing reformer operation, a degree of the increasing based on the available reformate, and responsive to lower than threshold engine load while available reformate is higher than the threshold level, disabling a reformer.

11. A method for a hybrid vehicle, comprising:
operating an engine with a first fuel while concurrently reforming the first fuel into a gaseous fuel at a reformer driven by engine exhaust energy; and in response to an engine shutdown request, shutting down the engine while continuing to reform the first fuel until a reformer temperature is below a threshold;
wherein the threshold is adjusted based on an available amount of the gaseous fuel, the threshold lowered as the available amount decreases.

12. The method of claim 11, wherein operating the engine while reforming the first fuel includes operating the engine at an adjusted engine speed-load, the adjusted engine speed-load based on one or more of the reformer temperature and the available amount of the gaseous fuel.

13. The method of claim 12, wherein the vehicle includes a continuously variable transmission coupled between the engine and vehicle wheels, and wherein operating the engine at the adjusted engine speed-load includes selecting a CVT speed ratio matching the adjusted engine speed-load.

14. The method of claim 12, wherein the adjusted engine speed-load includes an engine torque in excess of engine torque required to propel the vehicle, the method further comprising charging a system battery with the excess torque.

15. The method of claim 12, further comprising, while operating the engine at the adjusted engine speed-load, using motor torque from a motor to maintain a power level of the vehicle at an operator demanded power level.

16. The method of claim 11, further comprising adjusting an engine actuator to vary cylinder charge dilution in response to the available amount of the gaseous fuel, the actuator including one or more of an EGR valve and a variable cam timing actuator, and wherein the adjusting includes increasing an opening of the EGR valve and/or adjusting the variable cam timing actuator as the available amount of the gaseous fuel increases.

17. A hybrid vehicle system, comprising:
an engine including an intake and an exhaust;
an EGR passage including an EGR valve coupling the exhaust to the intake;
a first fuel injector for delivering a liquid fuel from a first fuel tank into the engine;
a second fuel injector for delivering a gaseous fuel from a second fuel tank into the engine;
an electric motor driven by a battery;
a continuously variable transmission (CVT);
a reformer coupled to the engine exhaust; and
a controller with computer readable instructions stored on non-transitory memory for:
operating the reformer to reform at least a portion of the liquid fuel into the gaseous fuel;
responsive to a first drop in demanded torque while a level of the gaseous fuel in the second tank is higher than a threshold level, transitioning to propelling the vehicle using motor torque at a first engine load; and
responsive to a second drop in demanded torque while a level of the gaseous fuel in the second tank is lower than the threshold level,
transitioning to propelling the vehicle using motor torque at a second engine load higher than the first load when a state of charge of the battery is higher than a threshold charge; and
when the state of charge of the battery is lower than the threshold charge, raising an engine load to provide higher than demanded torque while using excess torque to charge the battery.

18. The system of claim 17, wherein the controller includes further instructions for:
during the first drop in demanded torque, shutting down the engine while maintaining reformer operation until exhaust temperature is lower than a threshold temperature, the threshold temperature based on the level of the gaseous fuel in the second tank.

19. The system of claim 17, wherein the controller includes further instructions for adjusting a degree of raising the engine load based on the level of the gaseous fuel in the second tank relative to the threshold level, the engine load raised by adjusting a speed ratio of the CVT; and
while operating the engine, adjusting the EGR valve to increase cylinder charge dilution as the level of the gaseous fuel increases, and decrease the cylinder charge dilution as the level of the gaseous fuel decreases.

\* \* \* \* \*